United States Patent Office
3,720,046
Patented Mar. 13, 1973

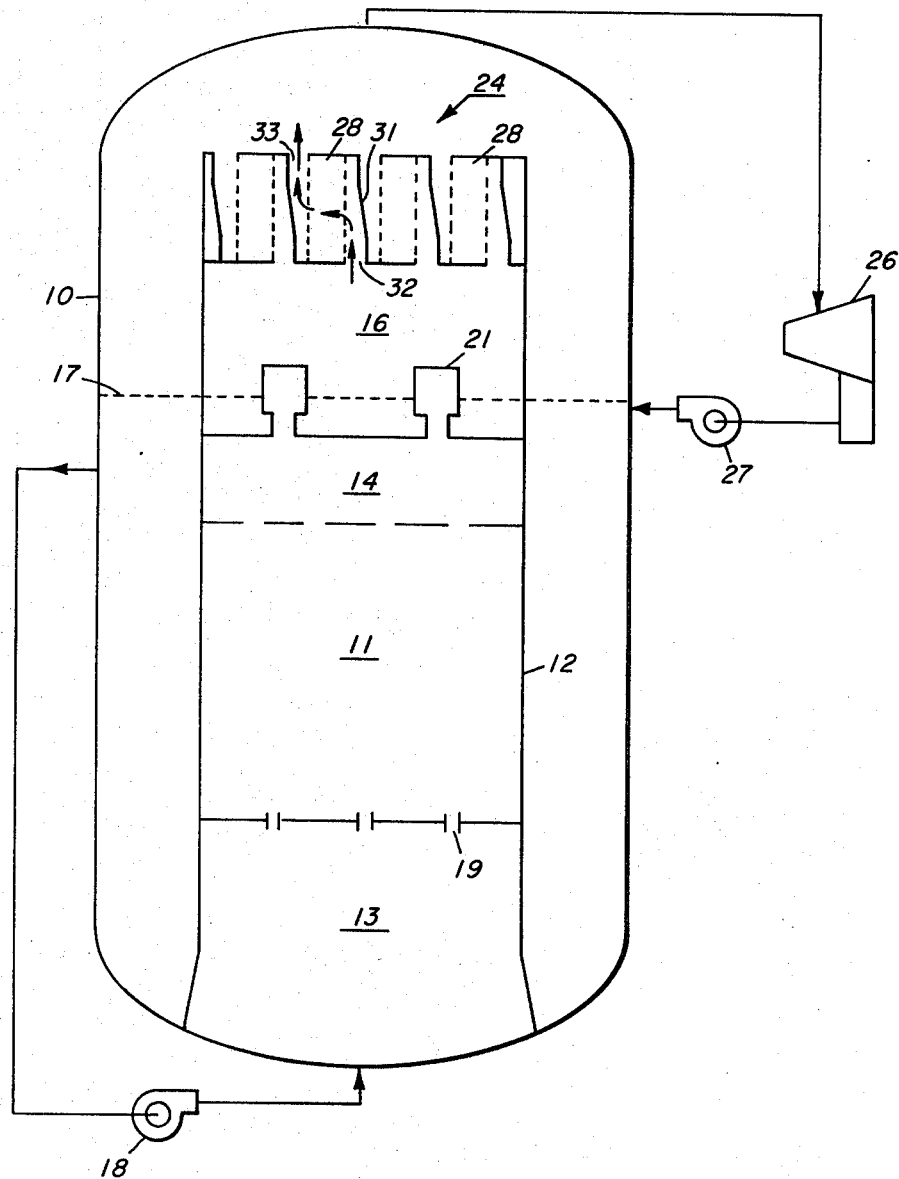
Fig. I
INVENTORS:
ALVYDAS A. KUDIRKA
ELLIOTT L. BURLEY
ROBERT H. MOEN
BY: *Samuel E. Turner*
ATTORNEY

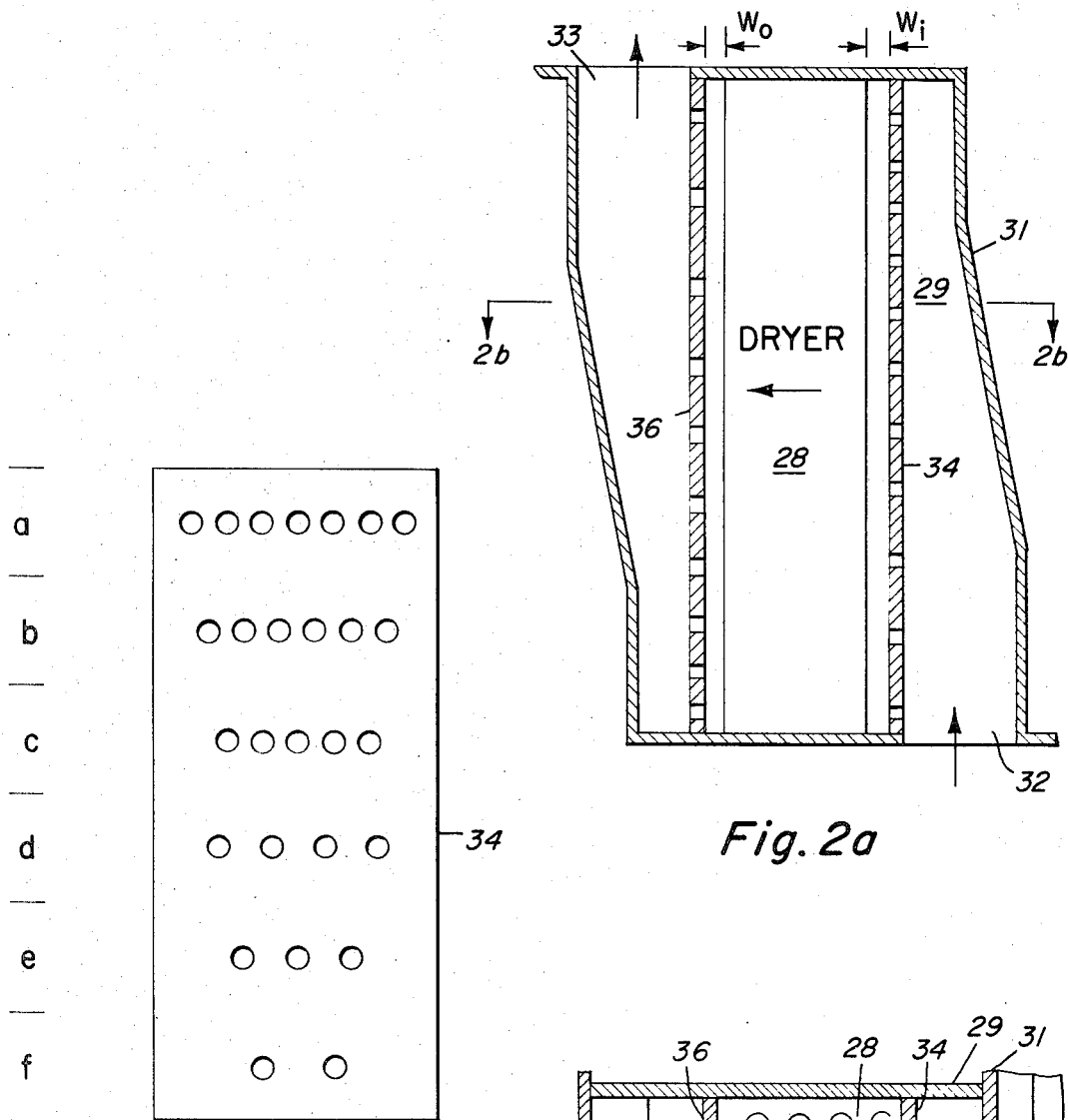
Fig. 2a
Fig. 3
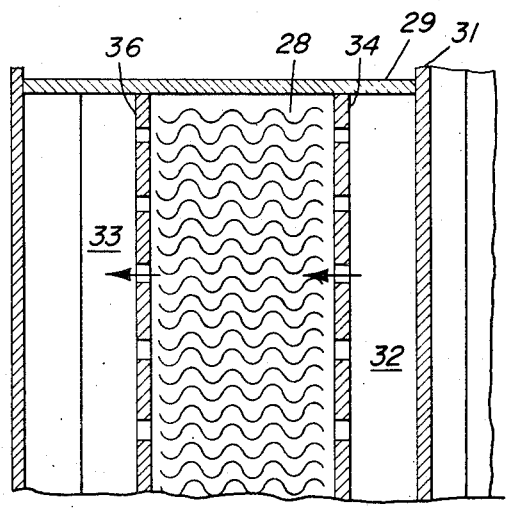
Fig. 2b

3,720,046
FLOW DISTRIBUTION APPARATUS
Alvydas A. Kudirka, Elliott L. Burley, and Robert H. Moen, San Jose, Calif., assignors to General Electric Company
Filed June 5, 1969, Ser. No. 830,769
Int. Cl. B01d 45/00
U.S. Cl. 55—414                7 Claims

ABSTRACT OF THE DISCLOSURE

A flow distribution structure for distributing the flow of fluid through low-pressure drop fluid processing apparatus such as a vane type gas separator or dryer situated between parallel or counter-flow headers wherein variably apertured flow distribution plates are provided adjacent inlet and outlet sides of the separator.

BACKGROUND

There are numerous examples of fluid processing apparatus which require control of the distribution of fluid flow therethrough. One example is the equalization of the distribution of steam flow through a steam dryer particularly of the vane or "chevron" type.

Most cases of the industrial use of steam require that the steam be "dry." For example, steam used to drive a prime mover, such as a steam turbine, must contain only a certain specified maximum amount of entrained water in the liquid phase.

Thus the typical steam generating system includes a separator arrangement which separates the steam from the gas-liquid mixture received from the steam generator or boiler. The separated steam is then passed through a gas dryer which removes the residual liquid.

Recent steam plant development includes the use of nuclear fission reactors as the heat source. In early nuclear plants, such as the Dresden I steam generator used at the Dresden Power Station near Chicago, Ill., the nuclear reactor is contained in its own pressure vessel while the steam separating and drying arrangement is contained in a separate, relatively large, steam drum.

In later nuclear plants it was found that a substantial reduction in cost could be achieved by placing the steam separating and drying apparatus within the nuclear reactor pressure vessel. Such an internal separating and drying system is used in the nuclear reactor steam generator of the KRB (Kernkraftwerk RWE-Bayernwerk) plant near Gundremmingen, Germany. In such a system, the steam-water mixture from the nuclear core is applied to an array of separators which remove a substantial portion of liquid from the mixture. (Separators especially suitable for in-vessel use are shown, for example, by J. T. Cochran in U.S. Pat. No. 3,329,130.) The separated steam is then passed through a dryer arrangement comprising an array of dryers of the vane or chevron type. (An embodiment of a vane type dryer or mist extractor is shown, for example, by E. W. Smith in U.S. Pat. No. 2,643,736.)

Efficient operation of dryers of this type requires that the steam be passed therethrough in a direction perpendicular to the dryer vanes. Thus the above-mentioned dryer arrangement includes an inlet header for each dryer for directing the vertically rising steam through the dryer and an outlet header for discharging the stream of steam upward after it has passed through the dryer.

There is a trend toward higher power density operation of nuclear reactor cores. That is, more heat is produced by a core of given size with resulting increased mixture flow rate and the production of a greater mass of steam. This greater mass of steam requires increased dryer capacity. However, the chevron or vane type dryers of the type under discussion operate satisfactorily only up to a certain design maximum steam velocity. Thus an increase in capacity requires an increase in the flow cross-section area of the dryer and thus an increase in the space occupied by the dryer arrangement in the reactor vessel. Cost and other considerations dictate that the increased vessel space required for larger dryers be acheived by vertical rather than lateral expansion of the dryer arrangement.

Fluid processing devices of this type are characterized by low flow resistance, that is, the pressure loss through the dryer is small compared to the dynamic pressure of the gas stream entering the inlet header (the dynamic pressure of the gas stream entering the inlet header being proportional to the square of the inlet velocity). This low flow resistance provides little aid in equalizing the distribution of flow through the device. Also, the resistance to gas flow through the dryer is non-isotropic, that is, the flow resistance is greater in a direction perpendicular to the ridges of the dryer vanes and is least in a direction parallel to the ridges in the dryer vanes. Thus pressure differentials across the inlet of the dryer tend to produce non-perpendicular velocity components in the gas flow through the dryer.

Increased height of the dryers and of the vertical dimensions of the inlet and outlet headers while maintaining the lateral dimensions substantially the same, results in higher steam flow velocities in the inlet and outlet headers. Thus the combination of increased header length and increased steam velocity in the headers aggravates the problem of maintaining uniform flow distribution through the dryers and the problem of maintaining the direction of steam flow perpendicular to the dryer vanes.

It is desirable to equalize the steam flow velocities through the dryers and to minimize non-perpendicular velocity components without substantial additional pressure drop.

Thus an object of the invention is to control the distribution and direction of flow through a fluid processing device such as a gas dryer or mist extractor.

SUMMARY

This and other objects of the invention are achieved by providing flow control means having variably distributed flow areas at the inlet and outlet of the dryer. In an illustrated embodiment of the invention the flow control means comprises perforated or apertured plates, the size, number and distribution of the perforations being selected to maximize the uniformity of flow through the dryer and to minimize the non-perpendicular velocity components of the flow.

DRAWING

The invention is more fully described hereinafter with reference to the accompanying drawing wherein:

FIG. 1 is a schematic illustration of a boiling water nuclear reactor system employing an array of internal steam dryers in accordance with the invention;

FIG. 2a is a longitudinal or side cross-section view of one of the dryers of the dryer array of FIG. 1;

FIG. 2b is a transverse or horizontal cross-section view of the dryer of FIG. 2a; and FIG. 3 is a front or elevation view of an example perforated plate forming the illustrated flow control means.

DESCRIPTION

Shown schematically in FIG. 1 is an example of a nuclear reactor steam generator system of the boiling water type. The reactor system includes a pressure vessel 10 containing a nuclear fuel core 11. The core 11 is surrounded by a shroud 12 which forms a water inlet plenum 13 beneath the core, a steam-water mixture chamber 14 above the core and a steam chamber 16 above the water level indicated by a dashed line 17.

Water under pressure is supplied to the inlet plenum 13 by, for example, a circulation pump 18 by which the water is forced through a plurality of orifices 19 upward past the nuclear fuel of the core 11 whereby a portion of the water is converted into steam. The resulting steam-water mixture in chamber 14 flows into a plurality of gas-liquid separating units 21 adapted to separate a substantial portion of the water from the mixture and to discharge the steam into the chamber 16. The steam passes from chamber 16 through a dryer arrangement 24, which extracts residual moisture, and is taken from the pressure vessel to a utilization device such as a steam turbine 26. The turbine exhaust may be condensed and returned as feedwater to the pressure vessel by a pump 27.

The dryer arrangement 24 is formed of an array of dryer units 28 (FIGS. 1, 2a and 2b) arranged in spaced rows. Partitions 29 between the dryer units 28 and baffles 31 between the rows of dryer units form inlet channels or headers 32 and outlet channels or headers 33. Thus the steam rising vertically from separators 21 in the chamber 16 enters the dryer inlet headers 32 and is directed thereby horizontally through the dryer units 28. The outlet headers 33 then direct the dried steam upward into the dome of the pressure vessel 10. [The dryer units 28 include liquid drains (not shown) for returning the removed water to the pool in the vessel. While the dryers 28 are illustrated in FIG. 1 as vertically mounted, this is not a requirement or a limitation of the invention. The dryers may be operated in a tilted arrangement limited by requirements of the liquid drain arrangement.]

As mentioned hereinbefore, to increase the size and hence the capacity of the dryer units it is found desirable to increase their height rather than to increase lateral dimensions including the cross-section areas of the inlet and outlet headers 32 and 33. The resulting increased header length and increased steam velocity in the headers tends to produce a nonuniform steam flow distribution through the dryers. There is also an increased tendency for the steam to pass through the dryer units in a nonhorizontal direction, that is, in a direction not perpendicular to the vanes of the dryer, with consequent reduction in the effectiveness of the dryers.

In accordance with the illustrated embodiment of the invention uniform flow distribution is maintained and vertical velocity components are minimized with increasing height of the dryer units by providing perforated flow control plates formed with suitably graduated flow passage area at the inlets and the outlets of the dryer units 28. Such flow control plates are shown in side view in FIG. 2a as in inlet flow control plate 34 between the inlet header 32 and the dryer unit 28 and an outlet flow control plate 36 between the outlet of the dryer unit and the outlet header 33.

An example of an inlet flow control plate 34 is illustrated in front or elevation view in FIG. 3. The size, number and distribution of the perforations can best be selected by experimentation to maximize the uniformity of flow through the dryer unit. In general for the arrangement shown, the flow passage area of the inlet flow control plate increases from bottom to top while, conversely, the flow passage area of the outlet flow control plate decreases from bottom to top. Ideally, the flow area or percent open area should vary continuously along the vertical dimension of the flow control plate. However, for practical purposes the plate may be divided into a number of sections a–f having different percentages of flow area or perforation densities.

In the flow control plate illustrated in FIG. 3 the perforations are, for example, one-quarter inch in diameter set on staggered centers to provide the desired percentage of open area by varying the center-to-center distances between perforations. However, the flow area may also be varied by using perforations of differing diameters.

The inlet and outlet flow control plates are sealed in the respective headers so that all of the flow must pass through the perforations. To allow flow development and to decrease unrecovered pressure drop the inlet plate 34 is spaced from the inlet of the dryer unit 28 by a space $W_i$ (of, for example, one-quarter to three-quarters of an inch) while the outlet plate 36 is spaced from the outlet of the dryer unit by a space $W_o$ (of, for example, from one-quarter to one-half inch).

The following table gives the percent open (or flow) area of example inlet and outlet flow control plates found suitable for use in a dryer arrangement wherein the dryer height is about 6 feet, the flow cross-section area of the dryer is about 5.4 square feet, the inlet cross-section area of the inlet header is about 160 square inches, the outlet cross-section area of the outlet header is about 160 square inches, and the steam flow rate is about 60,000 cubic feet per hour.

PERCENT OPEN AREA

|  | Section | Inlet plate | Outlet plate |
|---|---|---|---|
| Top | a | 32 | 15 |
|  | b | 30 | 17.5 |
|  | c | 28 | 20 |
|  | d | 25 | 22.5 |
|  | e | 23 | 24 |
| Bottom | f | 20 | 30 |

This dryer arrangement provides output steam containing about 0.1 or less weight percent of liquid for input steam containing about 10 weight percent of liquid. The unrecovered pressure drop is about 0.3 p.s.i. Without the flow control plates 34 and 36 the output steam contains at least 2 weight percent of liquid for the same input steam quality. Thus the flow control plates provide a substantial improvement in dryer performance.

Thus what has been described is a high-capacity, compact and efficient dryer arrangement which causes but nominal pressure drop.

While the invention has been described herein as used in a gas dryer arrangement, the flow distribution structure of the invention can advantageously be used to control and distribute flow through other apparatus such as a heat exchanger matrix or the like situated between parallel or oblique or counter flow inlet and outlet headers.

While an illustrated embodiment of the invention has been described herein, adaptations thereof may be made by those skilled in the art without departure from the spirit and scope of the invention as defined by the following claims.

What is claimed is:

1. The combination of: a vane-type separator for processing a stream of fluid flowing therethrough, said separator having an inlet side for receiving said fluid and an outlet side for discharging said fluid; a fluid inlet header adjacent the inlet side of said separator, said inlet header having an inlet opening for receiving said fluid and an outlet opening for directing said fluid through said separator, said inlet header being formed with a decreasing cross section area in the general direction of the fluid flow through said inlet header; a first apertured flow distribution plate sealed in said inlet header adjacent said inlet side of said separator, the apertures in said first plate being selected to provide a progressively increasing flow passage area per unit plate area in the general direction of said fluid flow through said inlet header; a fluid outlet header adjacent said outlet side of said separator, said outlet header having an inlet opening for receiving processed fluid and an outlet opening for discharging said processed fluid, said outlet header being formed with an increasing cross section area in the general direction of fluid discharge through said outlet header; and a second apertured flow distribution plate sealed in said outlet header adjacent said outlet side of said separator, the apertures in said second plate being selected to provide a progressively decreasing flow passage area per unit plate area in the general direction of fluid discharge through said outlet header.

2. The combination of claim 1 wherein said fluid is steam and wherein said separator is adapted to remove residual moisture from said steam.

3. The combination of claim 1 wherein said fluid enters said inlet header in a vertical direction, is directed through said separator in a horizontal direction and is discharged from said outlet header in a vertical direction.

4. The combination of claim 1 wherein the flow area of said inlet opening of said inlet header is less than the flow area of said inlet side of said separator.

5. The combination of claim 4 wherein the flow area of said outlet opening of said outlet header is less than the flow area of said outlet side of said separator.

6. The combination of claim 1 wherein said first flow distribution plate is spaced from the inlet side of said separator.

7. The combination of claim 6 wherein said second flow distribution plate is spaced from the outlet side of said separator.

References Cited

UNITED STATES PATENTS

| | | | |
|---|---|---|---|
| 1,381,767 | 6/1921 | Tracy | 122—491 |
| 1,708,656 | 4/1929 | Bradshaw | 55—418 X |
| 1,796,434 | 3/1931 | Boyrie | 55—418 X |
| 1,847,304 | 3/1932 | Bradshaw et al. | 55—344 |
| 1,847,307 | 3/1932 | Robertson et al. | 55—418 X |
| 1,884,501 | 10/1932 | Andrews et al. | 55—344 |
| 1,897,727 | 2/1933 | Hughes et al. | 55—444 X |
| 2,007,966 | 7/1935 | Fletcher | 122—491 |
| 2,143,191 | 1/1939 | Fletcher et al. | 122—491 |
| 2,739,663 | 3/1956 | Gurney | 122—491 X |
| 1,439,151 | 12/1922 | Dailey et al. | 55—419 |
| 1,703,173 | 3/1929 | Alexander | 55—450 X |
| 2,709,501 | 5/1955 | Toth et al. | 55—450 |
| 2,866,518 | 12/1958 | Lincoln | 55—348 X |
| 3,154,388 | 10/1964 | Purse | 23—288 F |
| 3,172,251 | 3/1965 | Johnson | 23—288F X |
| 3,350,860 | 11/1967 | Grassel et al. | 55—484 |
| 3,370,574 | 2/1968 | Hohnholt | 122—491 |
| 3,472,209 | 10/1969 | Roffler | 122—491 X |
| 3,498,590 | 3/1970 | Furlong | 55—483 X |

FOREIGN PATENTS

| | | | |
|---|---|---|---|
| 497,249 | 10/1953 | Canada | 55—348 |
| 969,129 | 5/1950 | France | 55—344 |
| 50,925 | 2/1941 | France | 55—518 |
| 686,434 | 1/1940 | Germany | 55—484 |
| 849,886 | 9/1952 | Germany | 55—418 |
| 41 | 1905 | Great Britain | 55—419 |
| 189,184 | 11/1922 | Great Britain | 55—444 |
| 875,428 | 5/1953 | Germany | 55—344 |
| 891,052 | 9/1953 | Germany | 55—484 |
| 909,288 | 4/1954 | Germany | 55—348 |
| 561,593 | 5/1944 | Great Britain | 55—484 |
| 580,936 | 9/1946 | Great Britain | 55—344 |

DENNIS E. TALBERT, Jr., Primary Examiner

U.S. Cl. X.R.

55—337, 344, 345, 418, 440, DIG. 23; 122—34, 491